(12) United States Patent
Motomatsu

(10) Patent No.: US 7,652,742 B2
(45) Date of Patent: Jan. 26, 2010

(54) SPACER SPRAYING SYSTEM, SPACER SPRAYING METHOD AND LIQUID CRYSTAL DISPLAY PANEL

(75) Inventor: Toshihiko Motomatsu, Kanagawa (JP)

(73) Assignee: NEC LCD Technologies, Ltd, Kanagawa (JP)

( * ) Notice: Subject to any disclaimer, the term of this patent is extended or adjusted under 35 U.S.C. 154(b) by 750 days.

(21) Appl. No.: 11/191,974

(22) Filed: Jul. 29, 2005

(65) Prior Publication Data

US 2006/0023129 A1    Feb. 2, 2006

(30) Foreign Application Priority Data

Jul. 29, 2004   (JP)   ............... 2004-221637

(51) Int. Cl.
*G02F 1/1339*    (2006.01)
*G02F 1/13*    (2006.01)
*B05C 5/02*    (2006.01)

(52) U.S. Cl. .................... 349/155; 349/187; 118/629

(58) Field of Classification Search .................. 108/69, 108/73, 86, 77, 78; 118/629, 326; 349/155
See application file for complete search history.

(56) References Cited

U.S. PATENT DOCUMENTS 5,248,192 A * 9/1993 Tazzia ................. 312/194
6,190,456 B1 * 2/2001 Matsuda ............... 118/629
6,889,721 B1 * 5/2005 Kim et al. .............. 141/1

2004/0257520 A1 * 12/2004 Yoshimura et al. ........ 349/187

FOREIGN PATENT DOCUMENTS

| JP | 5-241117 | | 9/1993 |
| JP | 9-258231 | A | 10/1997 |
| JP | 10078587 | A * | 3/1998 |
| JP | 2000-75301 | A | 3/2000 |
| JP | 2000-275652 | A | 10/2000 |
| JP | 2001-222012 | | 8/2001 |
| JP | 2002-148635 | A | 5/2002 |
| KR | 1998-40858 | A | 8/1998 |
| KR | 2003-54770 | A | 7/2003 |
| WO | 99-45429 | | 9/1999 |

* cited by examiner

*Primary Examiner*—David Nelms
*Assistant Examiner*—W. Patty Chen
(74) *Attorney, Agent, or Firm*—Sughrue Mion, PLLC

(57) ABSTRACT

A spacer spraying system and spacer spraying method are provided which are capable of spraying spacers uniformly in a liquid crystal display panel forming region on a substrate. A stage includes a main stage section having a predetermined size and an auxiliary stage section supported in the main stage section so as to be slid in the main stage section or another auxiliary stage section having a structure in which the auxiliary stage section can be connected to the main stage section. By making the auxiliary stage section be slid in the main stage section or be connected to the main stage section according to a size of a substrate mounted on the stage, a size of the stage is made changeable so that a distance between an edge portion of the stage and a liquid crystal display panel forming region existing near the edge portion of the stage falls within a predetermined range.

9 Claims, 14 Drawing Sheets

3a: Main Stage Section
3b: Auxiliary Stage Section
3: Stage

FIG.3A
3a
3b
FIG.3C
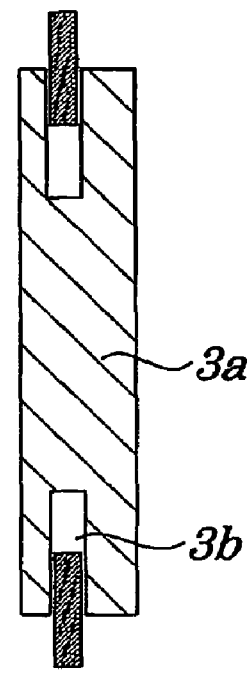
3a
3b
FIG.3B
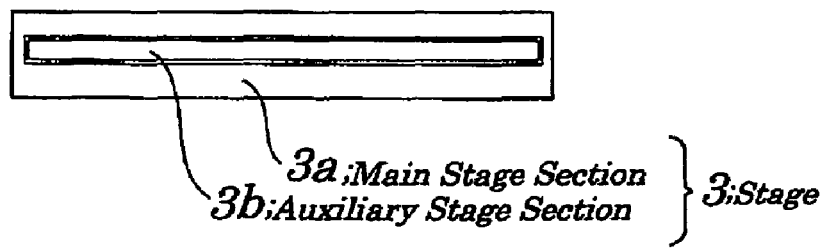
3a: Main Stage Section  
3b: Auxiliary Stage Section  } 3: Stage FIG.5A
FIG.5B
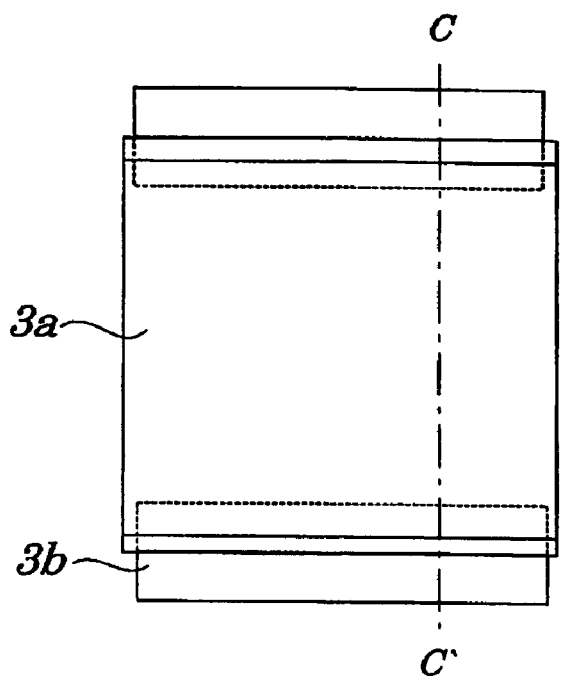
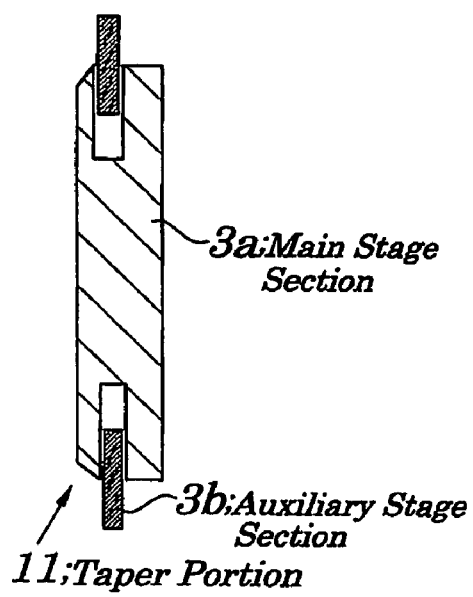
3a: Main Stage Section
3b: Auxiliary Stage Section
11: Taper Portion
FIG.5C
FIG.5D
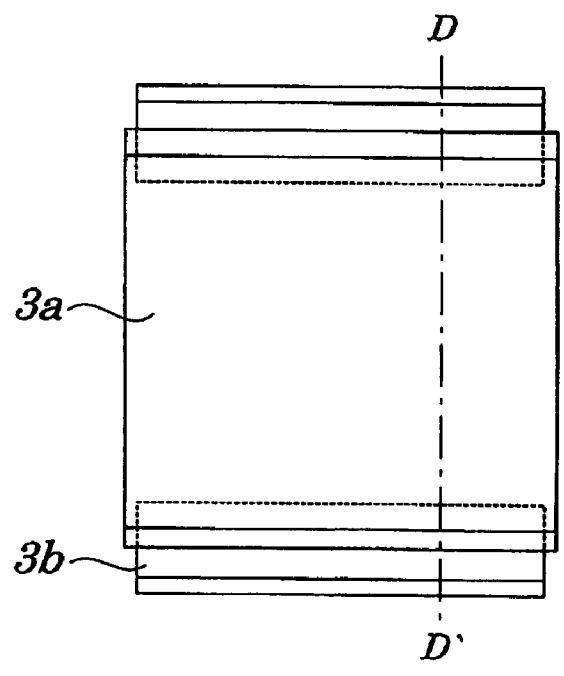
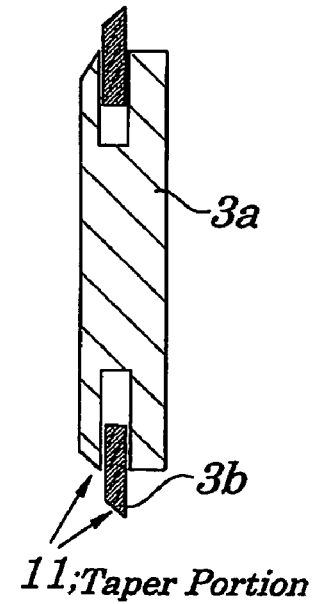
11: Taper Portion

*FIG.6A*  *FIG.6B*
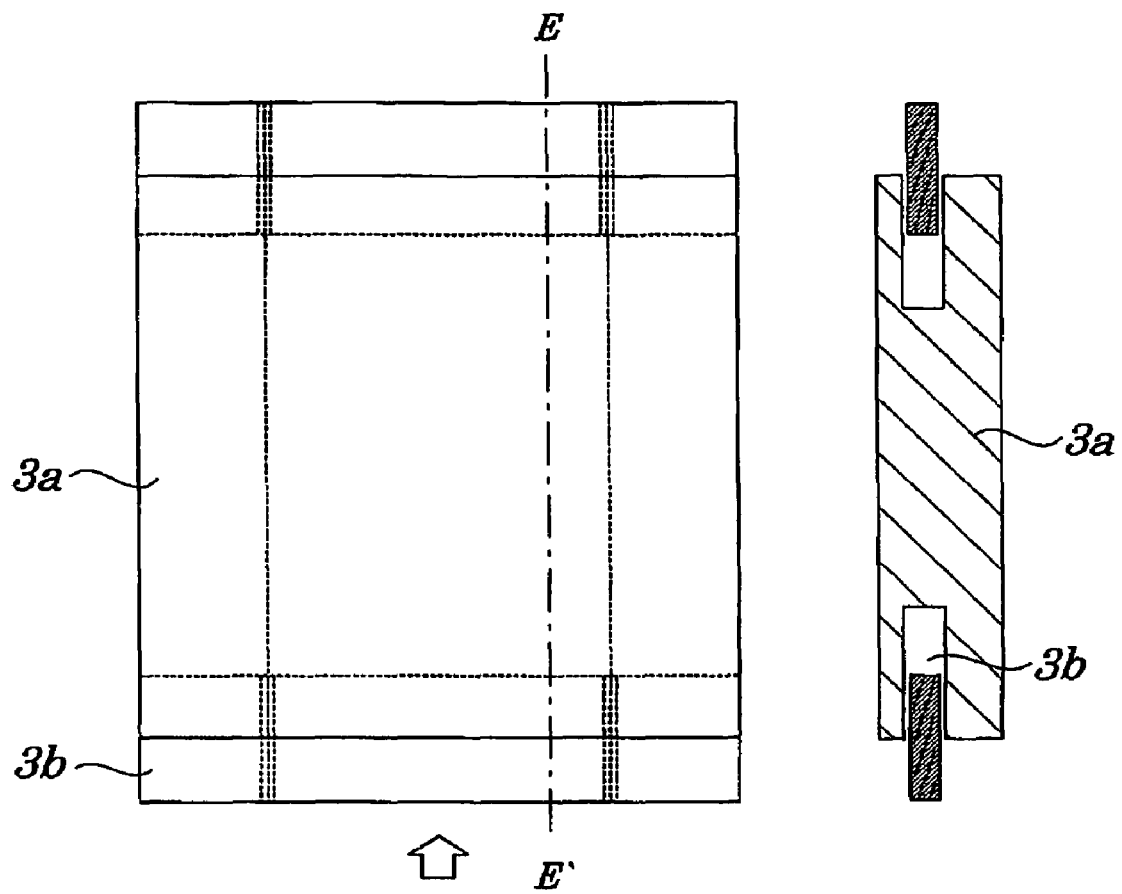
*FIG.6C*
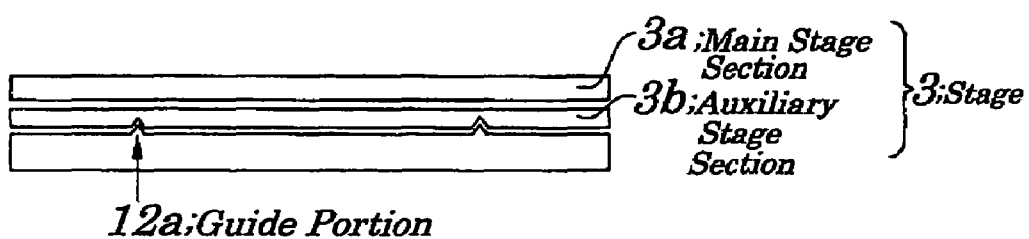

SPACER SPRAYING SYSTEM, SPACER SPRAYING METHOD AND LIQUID CRYSTAL DISPLAY PANEL

BACKGROUND OF THE INVENTION

1. Field of the Invention

The present invention relates to a manufacturing device and manufacturing method for a liquid crystal display panel and a liquid crystal display panel and more particularly to a spacer spraying system to spray spacers on a substrate of a liquid crystal display panel and a method for spraying the spacers on the liquid crystal display panel substrate and to a liquid crystal display panel having the liquid crystal display panel substrate manufactured by using the above spacer spraying system and the above method.

The present application claims priority of Japanese Patent Application No. 2004-221637 filed on Jul. 29, 2004, which is hereby incorporated by reference.

2. Description of First Related Art

A liquid crystal display panel is widely used as a display device for an AV (Audio-Visual) apparatus, an OA (Office Automation) apparatus, and a like due to its advantages of being thin, light weight, low in power consumption, and a like. The liquid crystal display panel of this type is made up of a TFT (Thin Film Transistor) substrate in which switching elements such as TFTs or a like are formed in a matrix form and a facing substrate in which a color filter, black matrix, or a like are formed. Insulating spacers made of polymer beads, silica beads, or a like, each having a specified size are arranged between both the substrates to form a gap having a specified size which is filled with a liquid crystal sealed hermitically therein. The liquid crystal display panel is so configured that an image is displayed by applying a voltage to an electrode formed on a pair of substrates facing each other or on one of the substrates to generate an electric field and by controlling an orientational direction of the liquid crystal according to the electric field to change transmitivity of light. In the liquid crystal display panel having such configurations as above, it is important that, in order to improve displaying quality, the gap between substrates facing each other is formed uniformly and, therefore, the spacers used to form the gap are sprayed uniformly on the substrates.

There are two methods of spraying the spacers on the substrates; one is a wet spraying method in which a spacer-containing solvent obtained by dispersing the spacers in the solvent for example flon (fluoro carbon), alcohol, or a like is jetted from a nozzle and the other is a dry spraying method in which the spacers are charged by an electrostatic charge process using an electrostatic gun or contact friction and the charged spacers are jetted from the nozzle. In the case of the wet spraying method, collection of flon, alcohol, or a like is required and the spacers are easily condensed in the solvent and, therefore, it is difficult to spray the spacers uniformly on the substrate and, as a result, the dry spraying method is widely used.

In the case of the dry spraying method, in ordinary cases, the spacers are positively charged and a repulsive force is exerted among the spacers and, therefore, partial condensation of the spacers does not occur, however, since a central portion of a stage is located immediately below the nozzle, an amount of the sprayed spacers tends to increase. On the other hand, since a distance between a peripheral edge portion of the stage and the nozzle increases at the central portion of a stage, the amount of the sprayed spacers tends to decrease at the peripheral edge portion of the stage, thus causing the sprayed spacers to be not uniform in a density distribution on an entire of the stage depending on a positional relation between the nozzle and the stage.

In order to improve such uniformity of a spacer spray density distribution caused by the positional relation between the nozzle and the stage, a method is disclosed in which a chamber of a spacer spraying system is charged so as to have a potential with the same polarity (positive polarity in ordinary cases) as that of the charged spacers, and the charged spacers being released in a direction of a charged wall of the chamber with the same polarity as the charged spacers are repelled from the charged wall of the chamber to a direction of the stage, thus enabling the spray density of the spacers to be distributed uniformly. For example, in Japanese Patent Application Laid-open No. 2002-148635, a spacer spraying system is disclosed in which a spraying chamber housing a substrate has a layer-stacked structure in which each layer is electrically insulated and a voltage having a potential with the same polarity as that of the spacers is applied from an outside to the most inner layer surface of the chamber to make the spacers travelling on surfaces of the chamber be repelled by the electrostatic force, thus enabling a amount of the sprayed spacers in a peripheral edge portion of the substrate to be reduced.

Though non-uniformity in a density distribution of the sprayed spacers caused by the positional relation between the above nozzle and the stage can be improved by using the spacer spraying system disclosed in the Japanese Patent Application Laid-open No. 2002-148635, the amount of the spacers that gather around the peripheral edge portion of the stage by electrostatic repulsion from the chamber wall increase. To solve this problem, by adjusting a level of a voltage to be applied to a wall surface of the chamber and/or by improving a shape of a nozzle used to spray the spacers or a spray pattern of spacers or a like, amounts of the sprayed spacers in the peripheral edge portion of the stage placed near the chamber wall are calibrated, however, even if such adjustments are made, it is impossible to uniformly control the density distribution of the sprayed spacers on the substrate.

The reason for the above is that the density distribution of the sprayed spacers is varied not only by a positional relation between the nozzle and the stage and/or the positional relation between the chamber wall and the stage but also by the positional relation between the stage and the substrate placed on the stage. More particularly, though an electric field is approximately constant in a central portion of the stage, the electric field is concentrated in an edge portion of the stage due to an edge effect, which causes the amount of the sprayed spacers to increase in the peripheral edge portion of the substrate located near the edge portion of the stage.

In the case where the liquid crystal display panel is small in size or there is a sufficient space in a position where the substrate is cut (that is, in the case where an interval between the liquid crystal display panels is large when a plurality of the liquid crystal display panels is produced by one piece of the substrate), since a distance between the edge portion of the substrate and the region where the liquid crystal display panel is formed can be made large, even if the spraying amounts of the spacers increase due to the edge effect, the influence caused by the increased amounts of the spacers can be made small in the region where the liquid crystal display device is formed. However, when the liquid crystal display panel is large in size and when many liquid crystal display panels are densely arranged on the substrate to achieve reduction in costs, inevitably, no sufficient space exists in the position where the substrate is cut and, as a result, the influence caused by the edge effect occurs even in the liquid crystal display panel forming region being located in the vicinity of the stage end.

In order to reduce the influence caused by the edge effect, a method is available in which the substrate is located far from the stage end by making the chamber or the stage larger in size. However, if the chamber is larger in size, the amount of the spacers that can be used during a one-time spacer spraying process increases, causing unnecessary consumption of high-priced spacers and an increase in costs in the manufacturing of the liquid crystal display panel. Moreover, a size of the liquid crystal display panel varies depending on each of products required by users and, if a distance between the stage end and the liquid crystal display panel forming region being located in the vicinity of the stage end also varies depending on each of the products, the spacer spraying density changes in every product and, as a result, variations in performance of the product occur.

3. Description of Second Related Art

As explained in the first related art, when a liquid crystal display panel is manufactured, it is of importance that a gap between a pair of substrates facing each other is uniform and, to achieve this, uniform spraying of spacers on surfaces of the substrates is required. Therefore, in the spacer spraying system of a type that applies a voltage to a chamber, by adjusting a level of a voltage to be applied to an inner wall of the chamber and by improving a shape of a nozzle to jet spacers or a pattern of spraying spacers, uniformity of sprayed spacers in a density distribution is improved.

For example, in a conventional spacer spraying system having dimensions as shown in FIG. 13A, when a voltage to be applied to an inner wall of the chamber is set at 4.0 kV, 7.0 kV, and 10 kV and a spraying mode for each of the voltages is set at a mode 2 and mode 3 as shown in FIG. 13B, respectively, spraying density of spacers corresponding to each distance from a substrate end is as shown in FIG. 14. Though the spacer spray density distribution can be changed by varying the applying voltage or the spraying mode, if the voltage on a wall surface of the chamber is made large (see, for example, "X" mark or "*" mark in FIG. 14), spraying density at the substrate end becomes larger. If the voltage on the wall of the chamber is made smaller (see triangular marks in black), though spraying density at the substrate end can be made somewhat smaller, spraying density in a position on an inner side of the substrate end (for example, 200 mm to 300 mm from the substrate end) becomes very small and, as a result, uniform distribution of the sprayed spacers cannot be obtained at any voltage and the tendency cannot be changed by a change in the spraying mode. The reason for that is that, in the method in which a voltage to be applied to the chamber inner wall is adjusted and/or a shape of the nozzle or a pattern of spraying spacers is improved, variations in spraying density caused by a positional relation between the nozzle and stage or between the chamber wall surface and the stage are merely reduced, and it is impossible to reduce variations caused by a positional relation between the stage and substrate formed on the stage, that is, variations in the spacer spraying density caused by concentration of an electric field at the stage end cannot be reduced.

Moreover, a method is proposed in which, by changing a voltage to be applied to a stage on which a substrate is formed, variations in spraying density of spacers are reduced. For example, a method is disclosed in Japanese Patent Application Laid-open No. 2000-275652 in which the stage is divided into a plurality of portions of the stage and each of the divided stages or each of some divided groups of the stages is set at a different potential. However, the purpose of the method disclosed in the above Patent Application is to improve distribution of spacers sprayed within an inner surface of the entire stage and, therefore, it is impossible to reduce variations in spacer spraying density caused by a positional relation between the stage and substrate formed on the stage, that is, variations in spacer spraying density caused by concentration of an electric field at an edge portion of the stage cannot be suppressed.

SUMMARY OF THE INVENTION

In view of the above, it is an object of the present invention to provide a spacer spraying system which is capable of spraying spacers uniformly in a region where a liquid crystal display panel is formed, irrespective of a size of the liquid crystal display panel and/or an arrangement of the liquid crystal display panel on a substrate, a method for the spraying spacers and the liquid crystal display panel manufactured by using the above spacer spraying system and/or the above spacer spraying method.

According to a first aspect of the present invention, there is provided a spacer spraying system including a spraying nozzle, a chamber, and a stage being supported within the chamber, for spraying spacers onto a substrate placed on the stage by using the spraying nozzle, wherein the stage includes a main stage section having a predetermined size and at least one auxiliary stage section associated with the main stage section, in such a manner that the stage is extendable to a desired size.

According to a second aspect of the present invention, there is provided a spacer spraying system including a spraying nozzle, a chamber, and a stage being supported within the chamber, for spraying spacers onto a substrate placed on the stage by using the spraying nozzle including:

a main stage section having a predetermined size, at outer edge portion of which at least one first attachment portion is provided; and a plurality of auxiliary stage sections each having a different size, and at inner edge portion of each of which at least one second attachment portion is provided;

wherein an auxiliary stage section selected arbitrarily out of the plurality of the auxiliary stage sections is attached to the main stage section, by associating the at least one second attachment portion of the auxiliary stage section with the at least one first attachment portion of the main stage section, whereby the stage is extendable to a desired size.

According to a third aspect of the present invention, there is provided a spacer spraying system including a spraying nozzle, a chamber, and a stage being supported within the chamber, for spraying spacers onto a substrate placed on the stage by using the spraying nozzle, wherein the stage includes a main stage section having a predetermined size and at least one auxiliary stage section being attached to the main stage section in such a manner that the at least one auxiliary stage section slides out from the main stage section in a direction parallel to a main face of the main stage section, whereby the stage is extendable to a desired size.

In the foregoing third aspect, a preferable mode is one wherein the auxiliary stage section is supported in a manner in which an upper face of the auxiliary stage section comes into contact with a lower face of the main stage section in a hit state and wherein the spacers deposited on an upper face of the auxiliary stage section are removed by making the auxiliary stage section be slid in a direction of the main stage section.

In the first, second and third aspects, a preferable mode is one wherein an insulator is placed between the main stage section and the auxiliary stage section so that the main stage section and the auxiliary stage section have electric potentials being different from each other.

Also, a preferable mode is one wherein the substrate is provided with a plurality of regions in each of which a liquid crystal display panel is formed and wherein the auxiliary stage section is associated with the main stage section, so that a distance between a peripheral edge portion of the stage and each of the regions existing near the peripheral edge portion of the stage falls within a predetermined range.

According to a fourth aspect of the present invention, there is provided a method for spraying spacers onto a substrate placed on a stage being supported in a chamber by using a spraying nozzle including the steps of:

assembling the stage from a main stage section having a predetermined size and at least one auxiliary stage section associated with the main stage section in such a manner that the stage is extendable to a desired size; and adjusting a size of the stage according to a size of the substrate to control density distribution of the sprayed spacers, According to a fifth aspect of the present invention, there is provided a method for spraying spacers onto a substrate placed on a stage being supported in a chamber by using a spraying nozzle including the steps of:

preparing a main stage section having a predetermined size, at outer edge portion of which at least one first attachment portion is provided;

preparing a plurality of auxiliary stage sections each having a different size, and at inner edge portion of each of which at least one second attachment portion is provided;

selecting one out of the plurality of the auxiliary stage sections according to a size of the substrate;

assembling the stage from a main stage section and the selected auxiliary stage section, thereby controlling density distribution of the sprayed spacers.

According to a sixth aspect of the present invention, there is provided a method for spraying spacers onto a substrate placed on a stage being supported in a chamber by using a spraying nozzle including the steps of:

assembling the stage from a main stage section having a predetermined size and at least one auxiliary stage section being attached to the main stage section in such a manner that the at least one auxiliary stage section slides out from the main stage section in a direction parallel to a main face of the main stage section; and adjusting a size of the stage according to a size of the substrate, by sliding out the at least one auxiliary stage section slides out from the main stage section, thereby controlling density distribution of the sprayed spacers.

In the foregoing sixth aspect, a preferable mode is one wherein the auxiliary stage section is supported in a manner in which an upper face of the auxiliary stage section comes into contact with a corresponding portion of the main stage section and wherein, after the spacers are sprayed onto the substrate, the spacers deposited on an upper face of the auxiliary stage section are removed or scraped by making the auxiliary stage section slide out from the main stage section, and the method for spraying spacers is repeated for a substrate placed newly on the stage.

In the fourth, fifth and sixth aspects, a preferable mode is one wherein, by placing an insulator between the main stage section and the auxiliary stage section and by applying a predetermined voltage to the auxiliary stage section using a voltage applying unit, a potential being different between the main stage section and the auxiliary stage section is set to control density distribution of the sprayed spacers.

Also, a preferable mode is one wherein the substrate has a plurality of regions in each of which a liquid crystal display panel is formed and wherein the auxiliary stage section is associated with the main stage section, so that a distance between a peripheral edge portion of the stage and each of the regions existing near the peripheral edge portion of the stage falls within a predetermined range.

According to a seventh aspect of the present invention, there is provided a liquid crystal display panel in which spacers are sprayed on at least one of a pair of substrates facing each other by using the spacer spraying system described above and/or the spacer spraying method described above.

With the above configurations, the spacers can be uniformly sprayed in the liquid crystal display panel forming region on the substrate. The reason is that the stage of the spacer spraying system to be used for the manufacturing of the liquid crystal display panel is made up of the main stage section being fixed to the chamber and the auxiliary stage section in a manner in which the auxiliary stage section is able to be slid in the main stage section or of the main stage section to be fixed to the chamber and the auxiliary stage section having a structure in which the auxiliary stage section is able to be connected to the main stage section and a stage size is able to be changed so that a distance between the edge portion of the stage and the liquid crystal display panel forming region existing near the edge portion of the stage by making the auxiliary stage section be slid according to a size of the liquid crystal display panel substrate to be mounted on the stage or by connecting the auxiliary stage section to the main stage section. This enables improvement of uniformity of the spacer spraying density and the manufacturing of the liquid crystal display panel of high displaying quality with a high yield and at low costs obtained by controlling the gap between a pair of the substrates facing each other so as to be uniform, irrespective of a size of the liquid crystal display panel and/or an arrangement of the liquid crystal display panel mounted on the substrate. Also, by configuring as above, uniformity of spraying density of the spacers can be improved and the liquid crystal display panel having high displaying quality in which the gap between the pair of the substrates facing each other is uniformly controlled can be manufactured with a high yield and at low costs.

BRIEF DESCRIPTION OF THE DRAWINGS

The above and other objects, advantages, and features of the present invention will be more apparent from the following description taken in conjunction with the accompanying drawings in which:

FIGS. 3A, 3B, and 3C are diagrams schematically illustrating configurations (state in which the auxiliary portion is slid) of the stage of the spacer spraying system of the first embodiment of the present invention;

FIGS. 5A, 5B, 5C, and 5D are diagrams illustrating variations of the configurations of the stage of the spacer spraying system of the first embodiment of the present invention;

FIGS. 6A, 6B, and 6C are diagrams illustrating variations of the configurations of the stage of the spacer spraying system of the first embodiment of the present invention;

DETAILED DESCRIPTION OF THE PREFERRED EMBODIMENTS

Best modes of carrying out the present invention will be described in further detail using various embodiments with reference to the accompanying drawings.

To solve such a problem as described in the second related art, the inventor of the present invention takes note of the positional relation between the stage and the substrate formed on the stage. That is, the inventor has found that, by setting a distance between a stage end and a region in which a liquid crystal display panel on a substrate is formed within a specified range, variations in spraying density of spacers caused by concentration of an electric field in the stage end can be reduced and a structure in which a size of a stage is changeable depending on a size of the substrate is obtained based on the knowledge. The structure is described by referring drawings shown below.

First Embodiment

Configurations of a spacer spraying system and spacer spraying method, and a liquid crystal display panel manufactured using the spacer spraying system are described by referring to FIG. 1 to FIG. 10.

Figure 1:
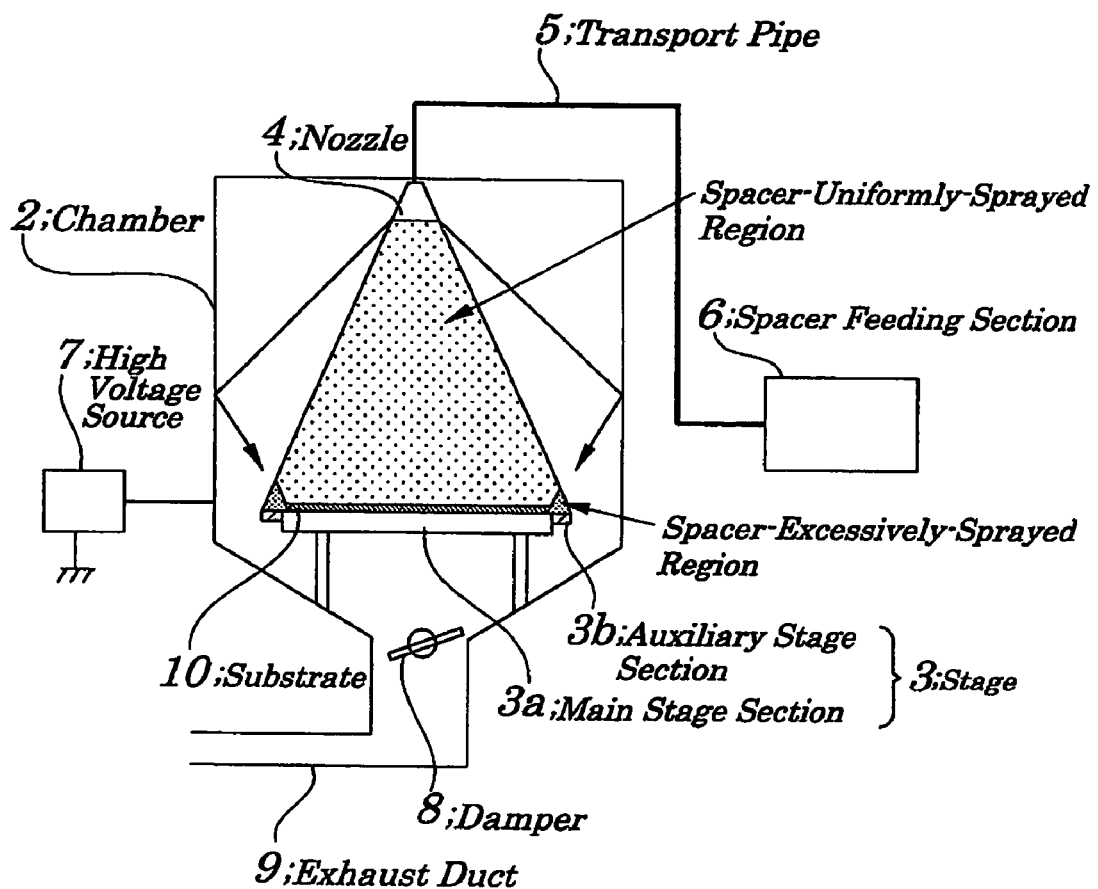
FIG. 1 is a diagram schematically for showing configurations of a spacer spraying system of a first embodiment of the present invention.
Figure 2A:
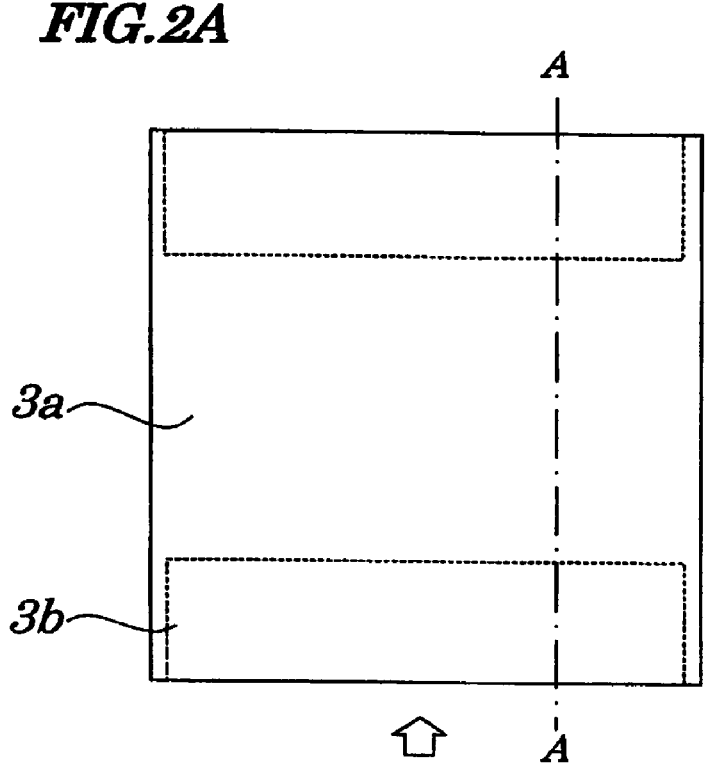
FIGS. 2A, 2B, and 2C are diagrams schematically illustrating configurations (state in which an auxiliary portion is mounted) of a stage of the spacer spraying system of the first embodiment of the present invention.
Figure 2B:
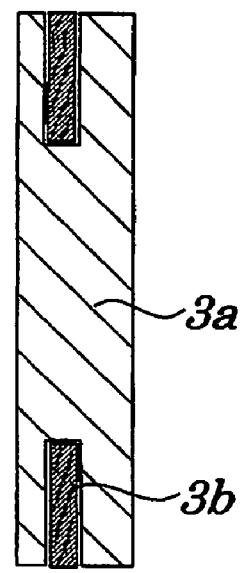
Figure 2C:
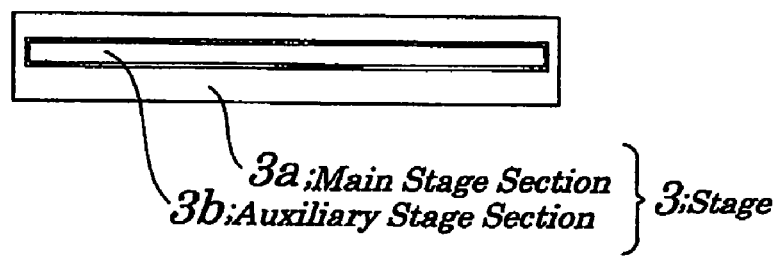
Figure 4A:
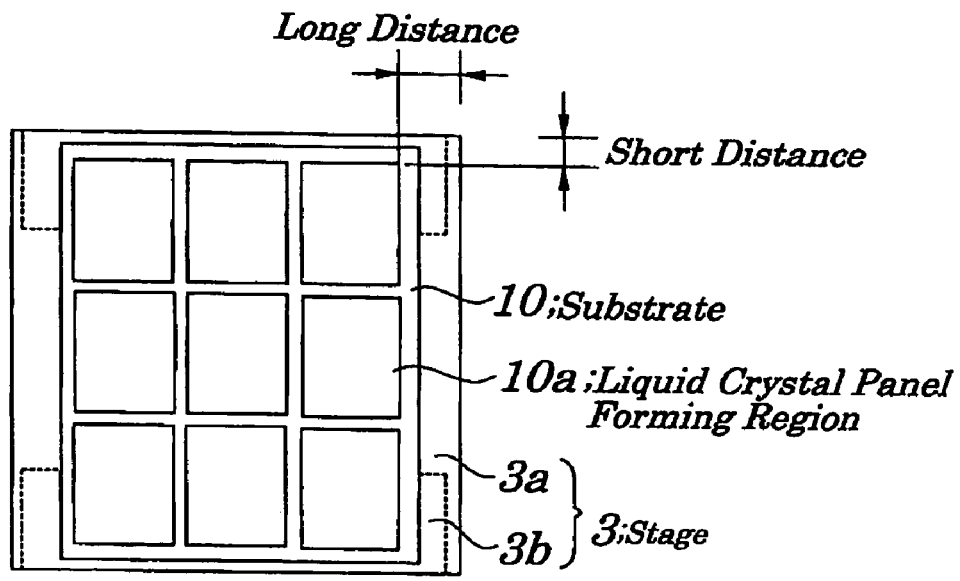
FIGS. 4A and 4B are diagrams schematically illustrating configurations of the stage (state in which the substrate is formed on the stage of the spacer spraying system) according to the first embodiment of the present invention.
Figure 4B:
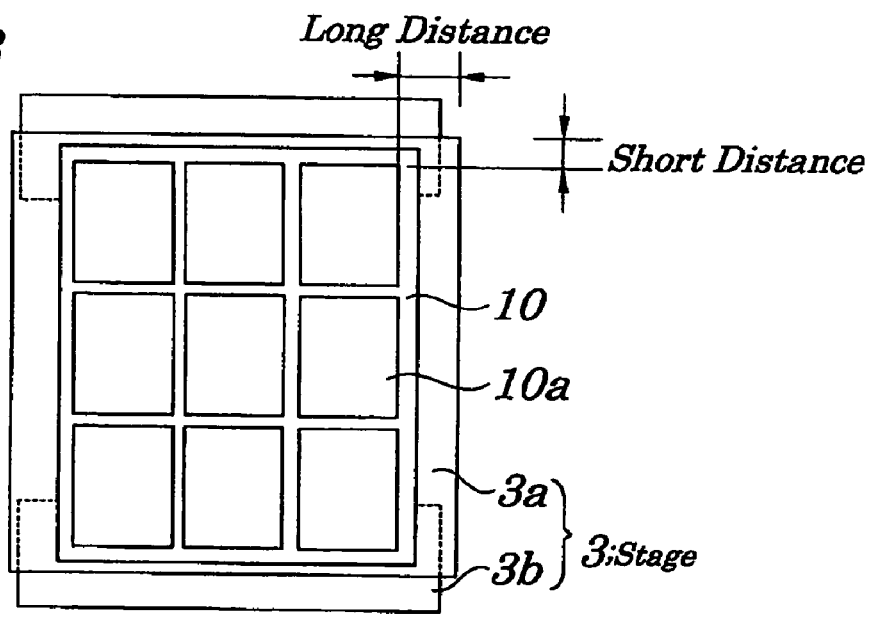
Figure 9A:
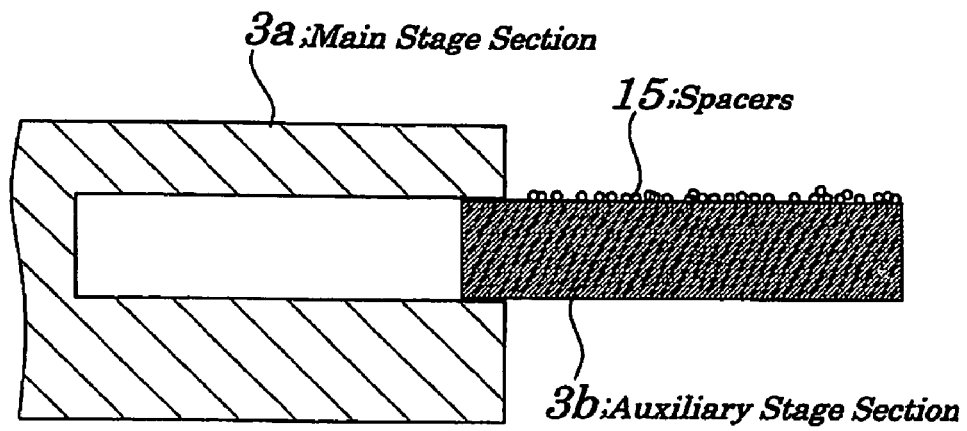
FIGS. 9A and 9B are diagrams schematically illustrating a method for removing spacers deposited on the stage of the spacer spraying system of the first embodiment of the present invention.
Figure 9B:
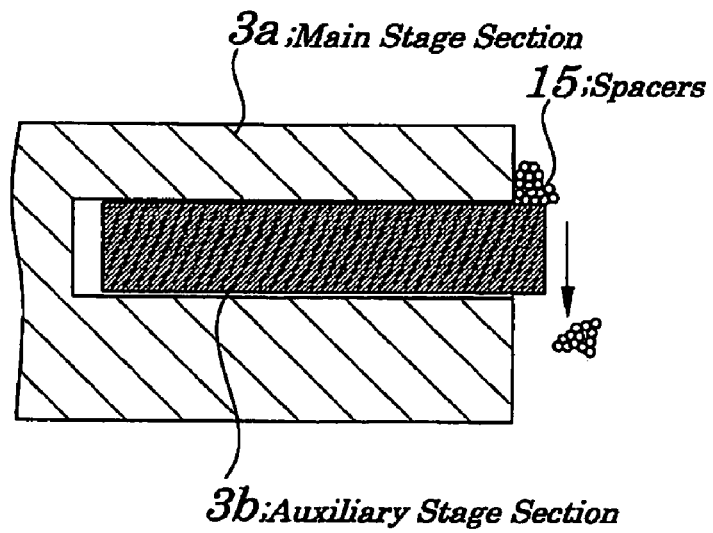
Figure 10:
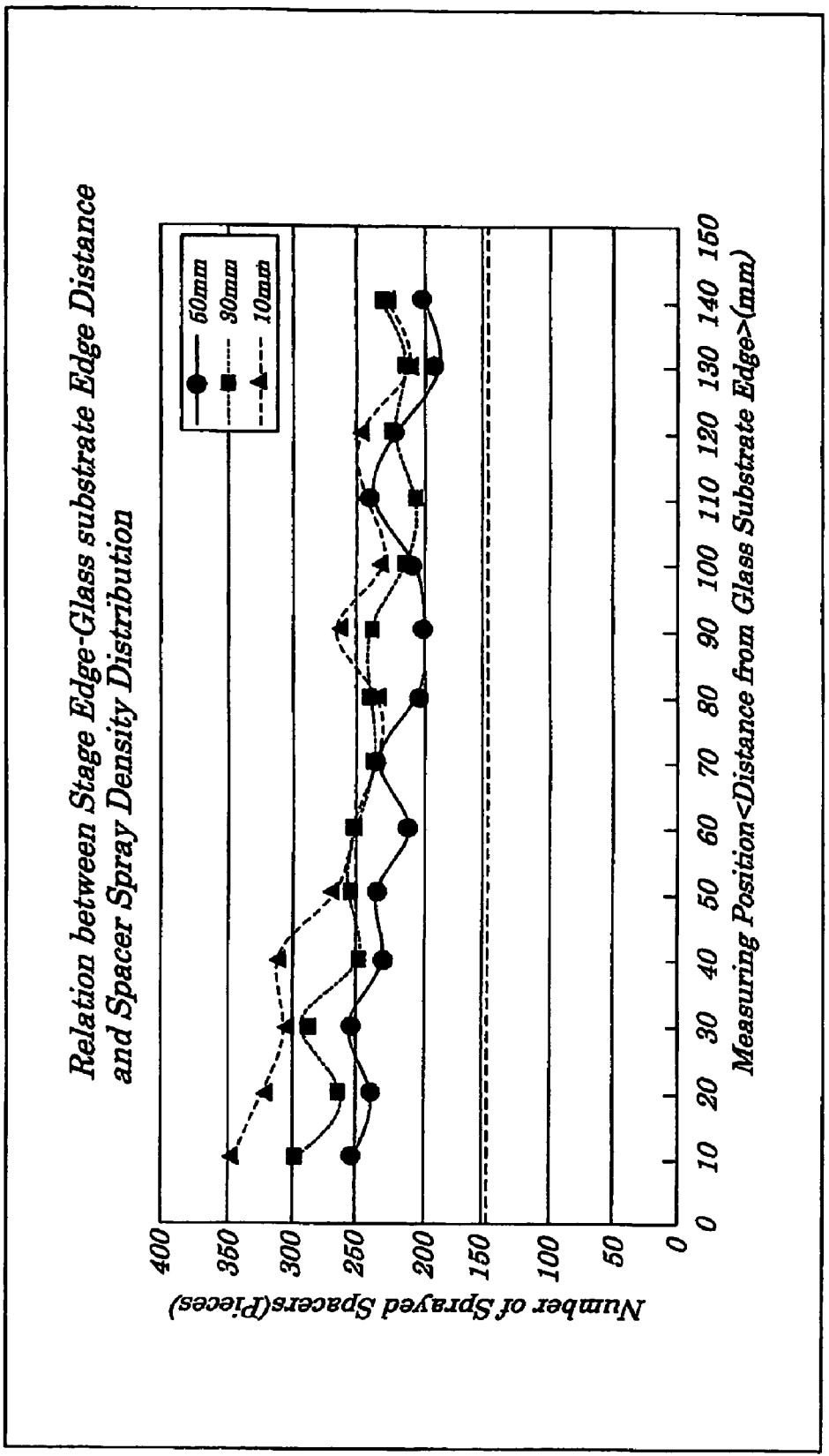
FIG. 10 is a graph explaining an effect of the spacer spraying system of the first embodiment of the present invention which shows a correlation between an edge portion of the stage and an edge portion of the substrate according to the first embodiment of the present invention.

FIG. 1 is a diagram for schematically illustrating configurations of the spacer spraying system of a first embodiment of the present invention. FIGS. 2A, 2B, and 2C are diagrams schematically illustrating configurations of a stage of the spacer spraying system. FIGS. 3A, 3B, and 3C are diagrams schematically illustrating configurations of the stage of the spacer spraying system. FIGS. 4A and 4B are diagrams schematically illustrating a state in which the substrate is formed on the stage of the spacer spraying system. FIGS. 5A to 5B are diagrams illustrating variations of the configurations of the stage of the spacer spraying system. FIGS. 9A and 9B are diagrams schematically illustrating a method for removing spacers deposited on the stage of the spacer spraying system. FIG. 10 is a graph explaining an effect of the spacer spraying system, which shows variation in spacer spray density in relation to a position where a glass substrate is placed on the stage of the spacer spraying system.

As shown in FIG. 1, the spacer spraying system 1 of the first embodiment of the present invention chiefly includes a chamber 2 which is held internally in a state of a reduced pressure by a damper 8, an exhaust duct 9, or a like, a stage 3 whose size is adjustable which is a feature of the embodiment, a nozzle which sprays positively or negatively charged spacers on a substrate (for example, a TFT substrate or a facing substrate making up a liquid crystal display panel) 10 placed on the stage 3, a spacer feeding section 6 which feeds spacers to the nozzle 4, a transport pipe 5, and a high voltage source 7 to set the chamber 2 at a specified potential. After the substrate 10 on which spacers are to be sprayed is placed on the stage 3, pressure inside the chamber 2 is reduced by using the damper 8 and the exhaust duct 9 and, if necessary, a voltage having the same potential as that of the spacers is applied to the chamber 2 by using the high voltage source 7 and the spacers fed from the spacer feeding section 6 via the transport pipe 5 are jetted through the nozzle 4 to make the spacers be deposited on the substrate 10. Moreover, in FIG. 1, the spacer spraying system 1 of a type that applies a voltage to the chamber 2 is shown, however, a spacer spraying system of a type that does not apply a voltage to the chamber 2 may be used and, in this case, the high voltage source 7 is not required.

In ordinary cases, the spacers are positively charged and the nozzle 4 used to jet spacers is also positively charged while the stage 3 is grounded and, therefore, an electric field occurs between the nozzle 4 and stage 3, which guides the spacers to the substrate on the stage 3. However, the intensity of the electric field is not uniform on the stage 3 and the electric field is concentrated due to an edge effect at an edge portion of the stage 3, thus causing an amount of sprayed spacers to increase. Furthermore, when a pulse voltage is applied to the chamber 2, the spacers repelled at the chamber 2 come flying to the stage 3 and, therefore, an peripheral edge portion of the stage 3 is changed to be a region (called a "spacer-excessively-sprayed region") where the amount of sprayed spacers becomes excessive.

According to experiments made by the inventor, it has been found that the "spacer-excessively-sprayed region" is located within a specified distance range from the edge portion of the stage 3 and, therefore, by making a liquid crystal display panel forming region on the substrate 10 be positioned, to some extent, far from the edge portion of the stage 3, variations in the amount of sprayed spacers in the liquid crystal display panel forming region can be reduced. Thus, in the embodiment of the present invention, by configuring the stage 3 so that a size of the stage 3 can be adjusted and changed, and so that the size of the stage 3 can vary depending on a size of the substrate 10 to be placed on the stage 3, the "spacer-excessively-sprayed region" and the liquid crystal display panel forming region on the substrate 10 do not overlap.

Concrete structures of the stage 3 are described by referring to FIGS. 2A, 2B, and 2C and FIGS. 3A, 3B, and 3C. FIG. 2A and FIG. 3A are plan views seen from an upper portion of the stage 3 (from a side of the nozzle 4) and FIG. 2B and FIG. 3B are cross-sectional views taken along a line A-A' and B-B', respectively, and FIGS. 2C and 3C are side views seen from a direction of the arrow.

As shown in FIGS. 2A, 2B, and 2C, the stage 3 of the embodiment includes a main stage section (stage proper) 3*a* to be fixed to the chamber 2 and an auxiliary stage section 3*b* to be housed so as to be able to be slid in/out in a direction parallel to the main face of the main stage section 3*a*. As shown in FIGS. 3A, 3B, and 3C, the stage 3 is so configured as to be changed to obtain a desired enlarged size by sliding out the auxiliary stage section 3*b* from the main stage section 3*a*.

Figure 7A:
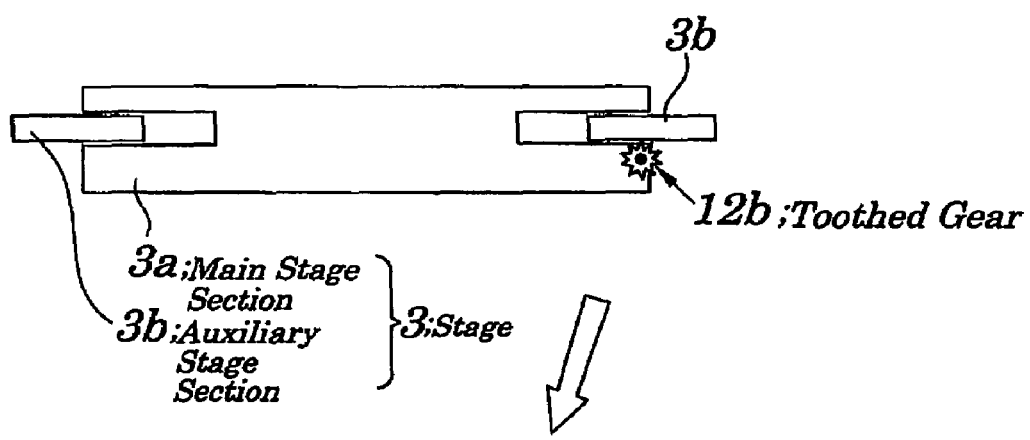
FIGS. 7A and 7B are diagrams illustrating variations of the configurations of the stage of the spacer spraying system of the first embodiment of the present invention.
Figure 7B:
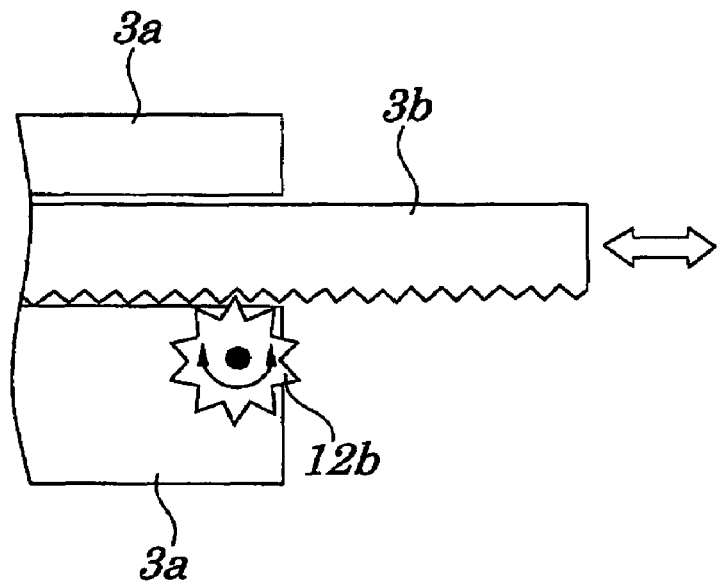
Figure 8A:
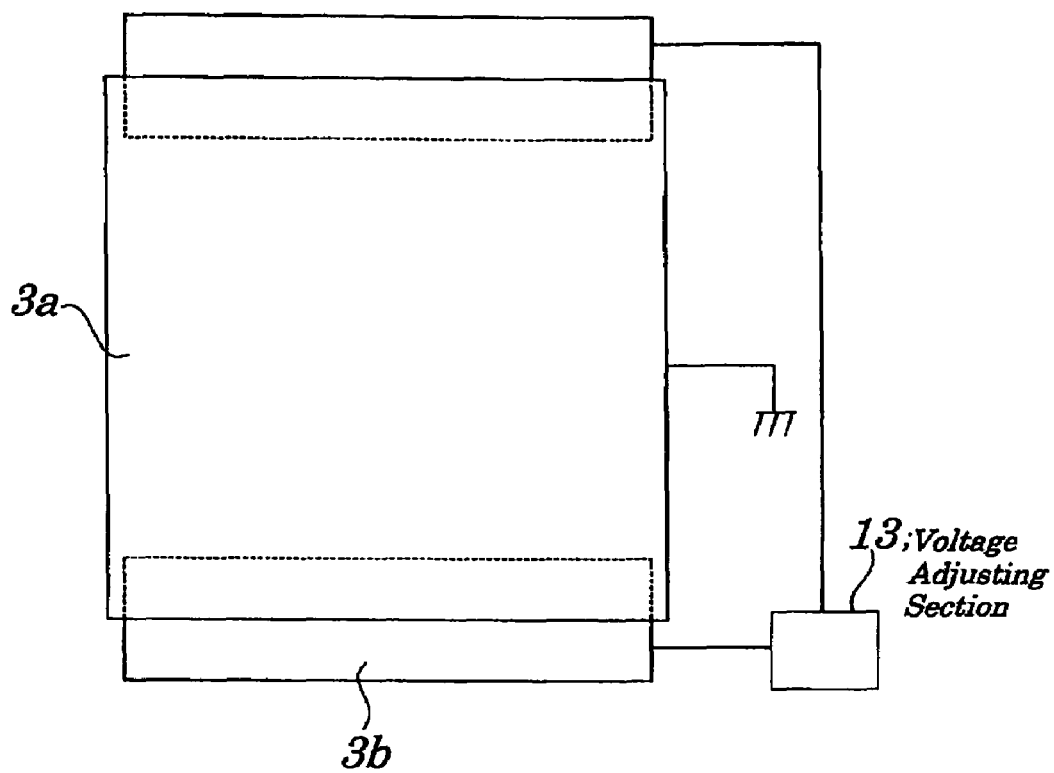
FIGS. 8A and 8B are diagrams illustrating variations of the configurations of the stage of the spacer spraying system of the first embodiment of the present invention.
Figure 8B:
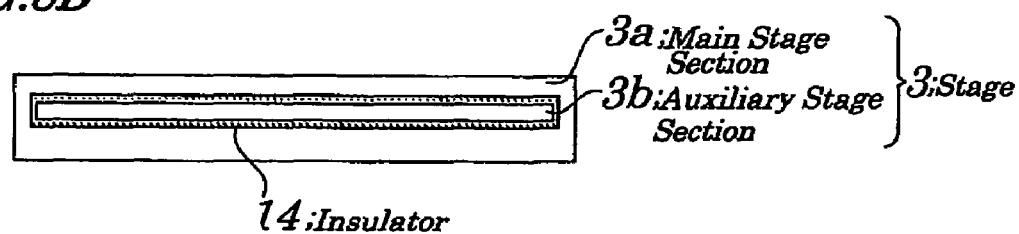

Moreover, in FIGS. 2A, 2B, and 2C and 3A, 3B, and 3C, as the stage having the simplest configurations, the stage is provided which has configurations in which the auxiliary stage section 3*b* is housed in the space formed in the main stage section 3*a* and slides out from the main stage section 3*a* by a manual means. However, the configurations of the stage 3 are not limited to those shown in FIGS. 2A, 2B, and 2C and 3A, 3B, and 3C. That is, any configuration may be used so long as at least a part of the auxiliary stage section 3*b* is supported by the main stage section 3*a* and the main stage section 3*a* and auxiliary stage section 3*b* make up the stage 3 having a desired size. The configurations for housing the auxiliary stage section 3*b*, its housing location, sliding structure of the auxiliary stage section 3*b*, existence or non-existence of the stopper, a width, length, thickness, or a like of the main stage section 3*a* and the auxiliary stage section 3*b* can be changed whenever necessary. For example, as shown in FIGS. 7A and 7B, configurations in which the auxiliary stage section 3*b* is slid out/in by rotating a toothed gear 12*b* may be employed. Moreover, in FIGS. 7A and 7B, the auxiliary stage section 3*b* is housed in both right and left directions on sides of the main stage section 3*a*, however, the auxiliary stage section 3*b* may be housed in at least one side of the main stage section 3*a*. Furthermore, the auxiliary stage section 3*b* may be housed in both up-down and right-left directions in the main stage section 3*a*.

In the above embodiment, the main stage section 3*a* is grounded so that spacers positively charged can be guided effectively into the stage 3 and, therefore, the auxiliary stage section 3*b* is made up of a metal material (preferably being the same material as that of the main stage section 3*a*) and the main stage section 3*a* and auxiliary stage section 3*b* are electrically connected so that the auxiliary stage section 3*b* and main stage section 3*a* are at the same potential. However, the main stage section 3*a* is not necessarily required to be connected directly to the auxiliary stage section 3*b* and the main stage section 3*a* and auxiliary stage section 3*b* may be separately grounded.

Next, a state in which the substrate 10 is placed on the stage 3 having the adjustable-size structure is described by referring to FIGS. 4A and 4B. FIG. 4A is a top view illustrating a state in which the substrate 10 is placed on the main stage section 3*a* housing the auxiliary stage section 3*b* and FIG. 4B is a top view illustrating a state in which the auxiliary stage section 3*b* is drawn from the main stage section 3.

For example, in the case in which liquid crystal display panel forming regions 10*a* are rectangular and spacers are sprayed on the substrate 10 on which the liquid crystal display panel forming region s 10*a* are aligned in three rows and three columns, since, if the main stage section 3*a* is square as shown in FIG. 4A, a distance between an edge portion of the main stage section 3*a* and an edge portion of each of the liquid crystal display panel forming regions 10*a* located in the vicinity of the edge portion of the main stage section 3*a* in a direction parallel to each of short sides of the liquid crystal display panel forming regions 10*a* is sufficiently long, there is no problem that spacer spray density distribution does not becomes uniform. However, since a distance between the edge portion of the main stage section 3*a* and a peripheral edge portion of each of the liquid crystal display panel forming regions 10*a* in a direction parallel to each of long sides of the liquid crystal display panel forming regions 10*a* is short, there occurs a problem that the spacer spray density distribution does not become uniform. To solve this problem, as shown in FIG. 4*b*, by drawing the auxiliary stage section 3*b* from the main stage section 3*a*, the stage 3 is expanded, as a whole, in a direction of each of the long sides of the liquid crystal display panel forming regions 10*a*. By configuring as above, the distance between the edge portion of the auxiliary stage section 3*b* and the peripheral edge portion of the liquid crystal display panel forming regions 10*a* located in the vicinity of the edge portion of the auxiliary stage section 3*b* can be made sufficiently long, thus preventing the problem that the spacer spray density distribution becomes non-uniform.

In order to confirm an effect obtained by changing a size of the above stage 3, by changing an interval between the edge portion of the stage 3 and edge portion of the substrate 10, the number of spacers sprayed on the substrate 10 in each state is measured. FIG. 10 shows the results. FIG. 10 shows the distribution of the number of sprayed spacers obtained when a distance between the edge portion of the stage 3 and edge portion of the substrate 10 is set at 10 mm, 30 mm, and 50 mm in the spacer spraying system 1 having the chamber 2 being 1680 mm×1680 mm in size and the chamber 3 being 1330 mm×1330 mm in size.

In FIG. 10, if the distance between the edge portion of the stage 3 and edge portion of the substrate 10 is 10 mm (shown by triangular marks in black and a dashed line), the number of sprayed spacers is as large as 348 pieces per unit area when the distance from the edge portion of the substrate 10 is 10 mm. Then, as the distance from the edge portion of the substrate 10 becomes longer, the number of sprayed spacers gradually becomes smaller. However, if a targeted number of the sprayed spacers is set at about 200 pieces, its lower limit is set at about 150 pieces, and its upper limit is set at about 250 pieces, the number of sprayed spacers exceeds a tolerance until the distance from the substrate 10 reaches 50 mm. Moreover, when the distance between the edge portion of the stage 3 and the edge portion of the substrate 10 is 30 mm (shown by rectangular marks in black and a broken line), the number of sprayed spacers is lowered to be 298 pieces when the distance from the edge portion of the substrate 10 is 10 mm, however, the number exceeds the tolerance till the distance from the edge portion of the substrate 10 reaches 30 mm. On the other hand, when the distance between the edge portion of the stage 3 and edge portion of the substrate 10 is 50 mm (shown by circular marks in black and a solid line), the number of sprayed spacers is 254 pieces which falls approximately within a tolerance when the distance from the edge portion of the substrate 10 is 10 mm. Therefore, by drawing the auxiliary stage section 3*b* so that the number of sprayed spacers falls within a tolerance required actually by a spacer spraying system being commercially available, the influence caused by the edge portion of the stage 3 can be reduced to a degree to which no problem occurs substantially.

Moreover, it is impossible to strictly define a desirable distance between the edge portion of the stage 3 and edge portion of the liquid crystal display panel forming region 10*a* located in the vicinity of the stage 3 since the distance varies depending on a shape of the chamber 2 or the nozzle 4 in the spacer spraying system 1, a spraying pattern of spacers, a voltage to be applied to the chamber 2, charged voltages of spacers, a shape of the stage 3, or a like. However, in the case of the space spraying device 1 in which a distance between the nozzle 4 and stage 3 is, for example, 1550 mm and a distance between the edge portion of the stage 3 and an inner wall of the chamber 2 is, for example, 175 mm, it is confirmed that, by setting the distance between the edge portion of the stage 3 and edge portion of the liquid crystal display panel forming region 10a at about 50 mm to about 130 mm, an amount of sprayed spacers can be fallen within a desirable range in an entire of the liquid crystal display panel forming region 10*a* on the substrate 10.

In FIGS. 2A, 2B, and 2C and in FIGS. 3A, 3B, and 3C, the structure is provided in which the auxiliary stage section 3*b* is drawn from the main stage section 3*a* and, therefore, a difference in height occurs between the main stage section 3*a* and auxiliary stage section 3*b* and there is a problem that variations in spraying density of spacers occur caused by concentration of an electric field on the portion having a difference in height. To prevent the occurrence of such a difference in height, a taper portion 11 may be provided at the edge portion of the main stage section 3*a*, as shown in FIG. 5A, or a taper portion 11 may be provided at the edge portion of the auxiliary stage section 3*b*, as shown in FIG. 5D, and, by configuring as above, an unnecessary difference in height can be eliminated and the concentration of the electric field can be suppressed. Moreover, as necessary, a preferable shape of the taper section 11 and a preferable taper angle may be employed. In FIGS. 5B and 5D, a cross-sectional shape of the taper portion 11 is in a form of a straight line, however, may be rounded off so that its thickness changes. Also, the taper portion 11 may be provided in even a side on which the auxiliary stage section 3*b* is not mounted in the same manner as above.

Also, in FIGS. 2A, 2B, and 2C to FIGS. 5A, 5B, 5C, and 5D, the structure is shown in which the auxiliary stage section 3*b* is slid out from the main stage section 3*a* so that the stage 3 can be extended essentially. However, another structure may be employed in which the auxiliary stage section 3*b* is supported in the main stage section 3*a* so that the auxiliary stage section 3*b* is made rotational by using a hinge (not shown) and, when a size of the stage 3 is to be made larger, by rotating the auxiliary stage section 3*b* using the hinge as a shaft, the auxiliary stage section 3*b* is connected to a side face of the main stage section 3*a*.

The above structure has a characteristic that a size of the stage 3 cannot be continuously variable, however, it is possible to eliminate a difference in height between the main stage section 3*a* and the auxiliary stage section 3*b* to become equal in height for the entire stage 3.

Also, still another structure may be used, as a structure to change a size of the stage 3, in which a convex portion (guide portion 12*a*) serving as a guide for drawing the auxiliary stage section 3*b* from the main stage section 3 is formed on the main stage section 3*a* as shown in FIGS. 6A, 6B, and 6C and a concave portion having a specified size at a place corresponding to the convex portion is formed. By configuring as above, the size of the auxiliary stage section 3*b* is made the same as that of a side of the main stage section 3*a* and, therefore, the stage 3 becomes rectangular which can suppress deviation in an electric field. Also, as shown in FIGS. 2A, 2B, and 2C to FIGS. 6A, 6B, and 6C, the structure in which the auxiliary stage section 3*b* slides out from the main stage section 3*a* by a manual means so that the stage 3 is extendable is provided. However, as shown in FIG. 7, still another structure may be employed in which a toothed gear 12*b* is attached to a side or a like of the main stage section 3*a* so as to be rotational and, on the other hand, convex and concave portions each having a shape that engages in the toothed gear 12*b* are formed in a portion that comes into contact with the toothed gear 12*b* at the bottom surface of the auxiliary stage section 3*b*, thus enabling the auxiliary stage section 3*b* to be slid out in a direction parallel to a main face of the stage 3 by rotating the toothed gear 12*b*. By configuring as above, amounts of drawing the auxiliary stage section 3*b* can be controlled accurately and a size of the stage 3 can be automatically adjusted by rotating the toothed gear 12*b* using a motor or a like.

Moreover, since it is anticipated that an electric field distribution changes at time of drawing the auxiliary stage section 3*b* and, as a result, distribution of sprayed density of spacers is changed and, before spacers are sprayed on the substrate 10 on which the liquid crystal display panel is formed, the distribution of the spraying density of spacers is measured in advance and, according to the result, amounts of drawing the auxiliary stage section 3*b* can be finely adjusted. In this case, the spraying density of spacers may be measured by any type of method. For example, probes at specified intervals in the vicinity of the stage 3 are mounted and, by using this probe, charged spacers are detected and, based on potentials of the probes, displaying density of spacers existing in that place can be estimated. Also, a magnetic field generated by movements of charge spaces is measured by using a Hall device and, based on current values of the Hall device, spraying density of spacers occurring in that place is estimated. Furthermore, light is irradiated from an upper portion of the stage and light reflected by the stage or test substrate is measured by using a light detecting means and, based on an output from the light detecting means, spraying density of spacers is obtained. Thus, by mounting the spacer spraying density measuring means such as a probe, Hall device, or a like as described above in advance on the spacer spraying system 1, an amount of drawing the auxiliary stage section 3*b* can be set more accurately.

Also, in FIGS. 2A to 2C and FIGS. 7A and 7B, the main stage section 3*a* and the auxiliary stage section 3*b* are electrically connected to each other and are set at the same potential (here, ground potential), however, may be set at a potential being different from each other. For example, as shown in FIGS. 8A and 8B, the main stage section 3*a* and the auxiliary stage section 3*b* are insulated using an insulator 14 from each other and the main stage section 3*a* is grounded and a potential of the auxiliary stage section 3*b* may be set by using a voltage adjusting section 13 mounted in advance. If a result about the spacer spraying density obtained by using the above methods shows that the spacer spraying density at an edge portion of the substrate 10 is large, by making a voltage of the auxiliary stage section 3*b* be nearer to that of the spacers, uniformity of the spacer spraying density can be improved further.

Moreover, it is anticipated that repeated use of the spacer spraying system 1 causes deposition of the spacer on the stage 3 on the auxiliary stage section 3*b* in particular at every spraying process and the stage 3 is covered with an insulator and, as a result, electric field distribution in the stage 3 changes and repeatability of the spacer distribution cannot be obtained. However, in the structures shown in FIGS. 2A to 2C and FIGS. 8A and 8B, the auxiliary stage section 3*b* is supported by the main stage section 3*a* in a manner in which the auxiliary stage section 3*b* can be inserted or drawn to and from the main stage section 3*a* and, therefore, by setting sizes in a manner in which an upper face of the auxiliary stage section 3*b* comes in contact straight with a lower face (the insulator 14 in FIGS. 8A and 8B) of the main stage section 3*a* as shown in FIGS. 9A and 9B and, when the auxiliary stage section 3b is housed in the main stage section 3a after the completion of spraying of the spacers 15, the spacers 15 deposited on the auxiliary stage section 3b can be collected and can be removed from the auxiliary stage section 3b and, therefore, a surface of the auxiliary stage section 3b can be cleaned simply, thus enabling accurate control of the spacer spraying density.

Thus, since the stage 3 of the spacer spraying system 1 of the embodiment of the present invention is made up of the main stage section 3a fixed to the chamber 2 and the auxiliary stage section 3b being housed in the main stage section 3a in a manner in which the auxiliary stage section 3b is slid in the main stage section 3a, the auxiliary stage section 3b can be drawn according to a size of the substrate 10 being mounted on the stage 3 and a distance between the edge portion of the stage 3 and edge portion of the liquid crystal display panel forming region 10a of the substrate 10 can be set within a predetermined range, thereby enabling an influence by the edge portion of the stage 3 to be avoided and uniformity of the spacer spraying density to be improved. Moreover, since it is possible to set the size of the stage 3 to be arbitrary irrespective of a size of the substrate 10 or a position of cutting the substrate 10, an optimum spacer spraying density can be obtained all the time.

Second Embodiment

A spacer spraying system and a spacer spraying method of a second embodiment of the present invention and a liquid crystal display panel manufactured by the spacer spraying system are described by referring to FIGS. 11A, 11B, and 11C and FIGS. 12A and 12B, which are diagrams showing configurations of a stage of the spacer spraying system.

In the first embodiment of the present invention, the stage 3 is made up of the main stage section 3a and the auxiliary stage section 3b being so configured as to be slid in the main stage section 3a. However, in the structure in which the auxiliary stage section 3b is drawn out from the main stage section 3a, a difference in height easily occurs in a connected portion between the main stage section 3a and auxiliary stage section 3b and configurations of the stage 3 becomes complicated. On the other hand, a size of the liquid crystal display panel and its cutting positions are not so many. To solve this problem, according to the second embodiment, the size of the stage 3 is not adjusted in an arbitrary manner by sliding the auxiliary stage section 3b but changed by connecting the auxiliary stage section 3b being mounted, in advance, to the main stage section 3a.

Figures 11A, 11B, 11C:
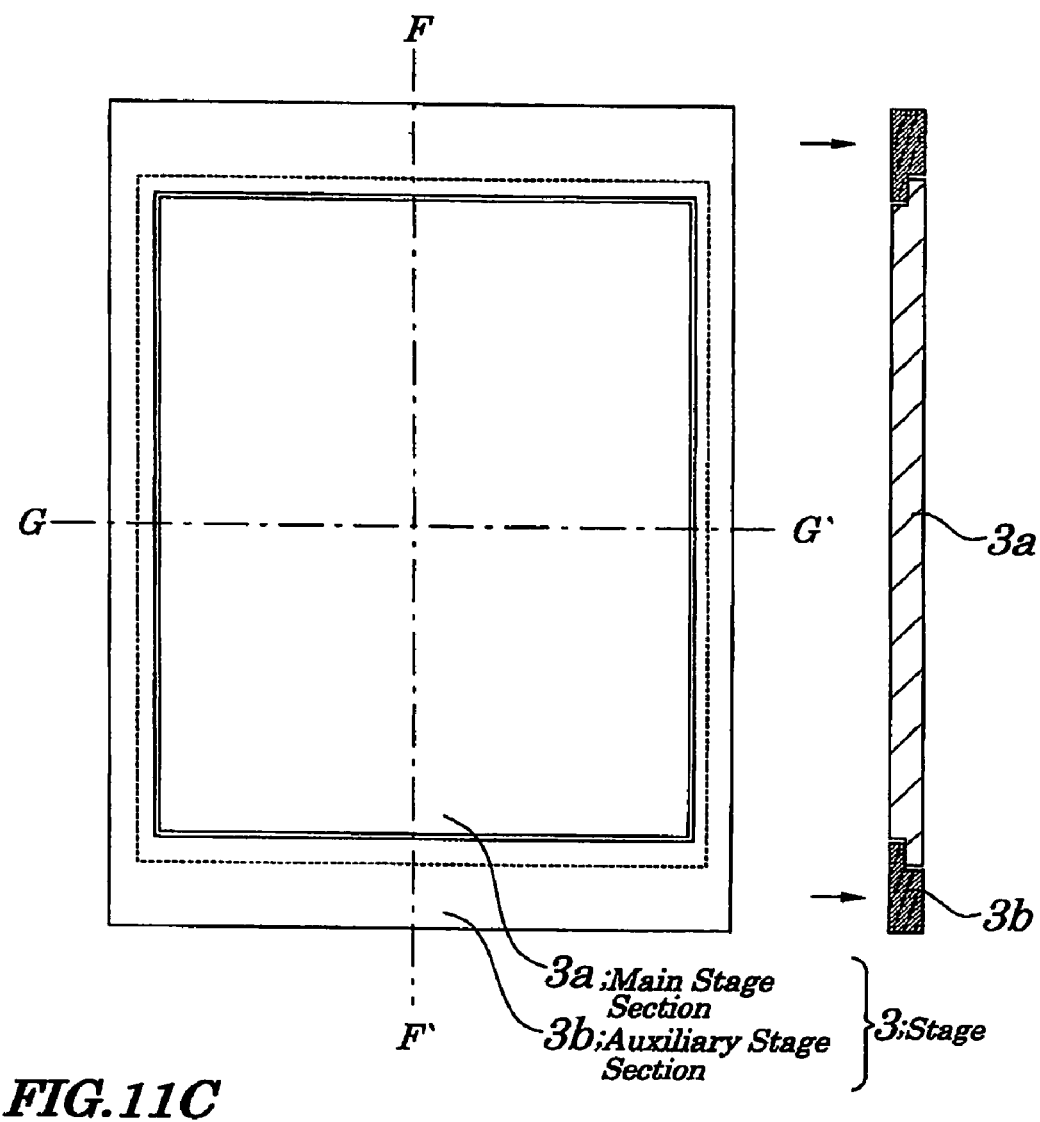
FIGS. 11A, 11B, and 11C are diagrams schematically showing configurations of a stage of a spacer spraying system of a second embodiment of the present invention.

More specifically, as shown in FIGS. 11A, 11B, and 11C, the stage 3 according to the second embodiment of the present invention is made up of a main stage section 3a fixed to the chamber 2 and having a structure in which an auxiliary stage section 3b can be attached to at least a part of an outer edge portion of the main stage section 3a (one of connecting means connected to each other) and one or a plurality of types of auxiliary stage section 3b having a structure in which the auxiliary stage section 3b can be connected to at least a part of an internal edge section of the main stage section 3a and, by fitting the auxiliary stage section 3b from an upper portion of the main stage section 3a, the main stage section 3a is connected to the auxiliary stage section 3b and, as a result, the stage 3 having a desired size can be formed.

Figure 12A:
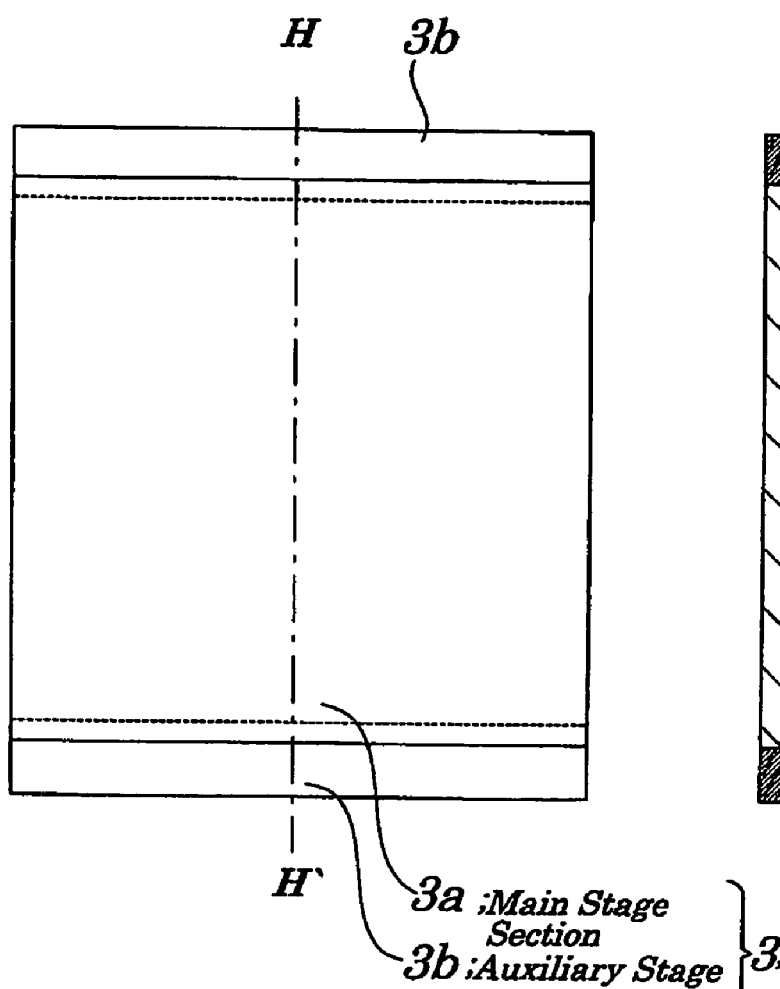
FIGS. 12A and 12B are diagrams showing variations of a stage of the spacer spraying-system of the second embodiment of the present invention.
Figure 12B:
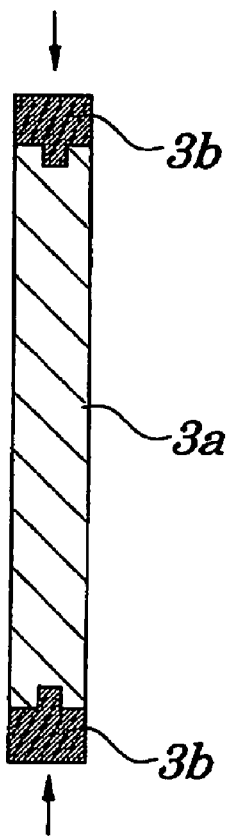
Figure 13A:
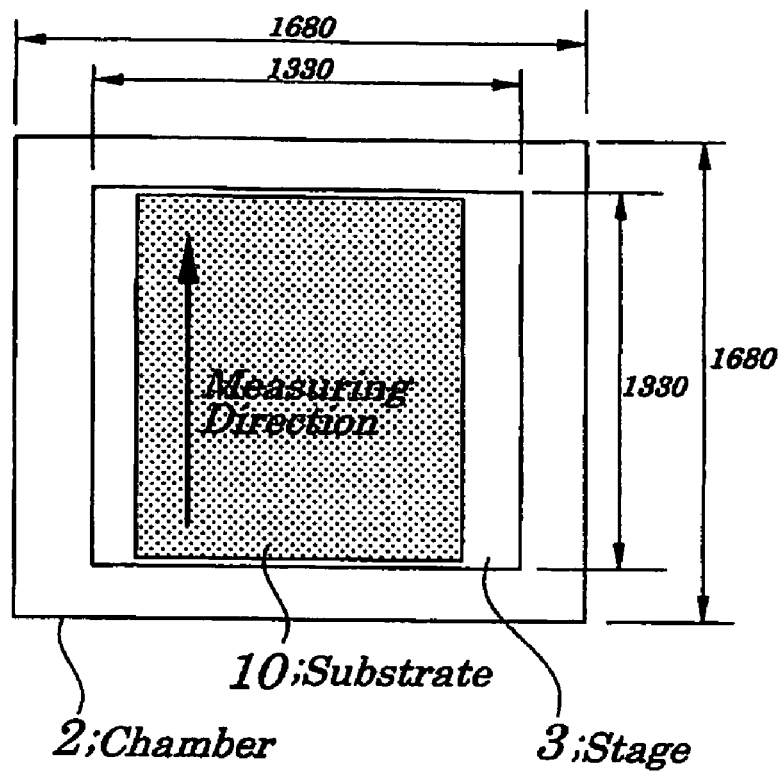
FIG. 13A is a diagram explaining a positional relation between a chamber, a stage, and a substrate employed in a conventional spacer spraying system
Figure 13B:
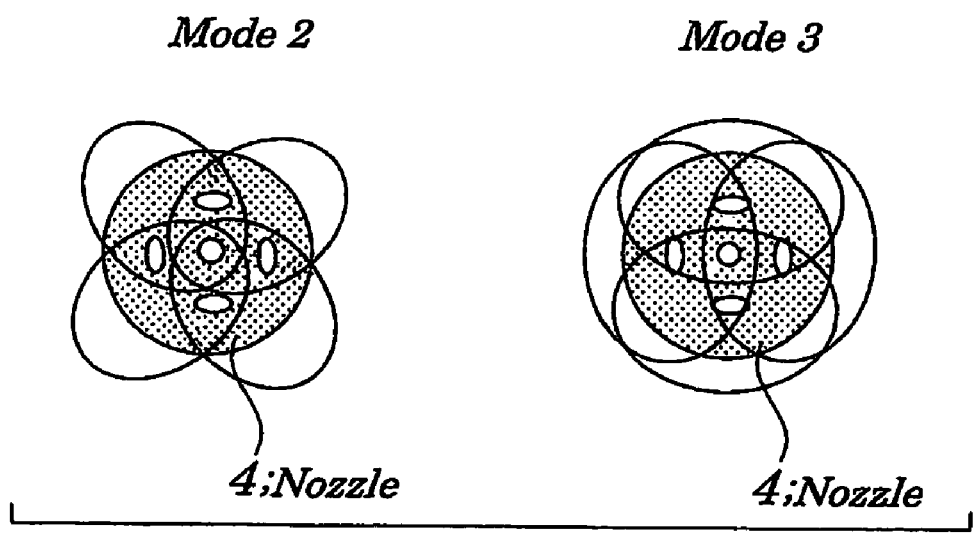
FIG. 13B is a diagram explaining a spraying mode employed in the conventional spacer spraying system.
Figure 14:
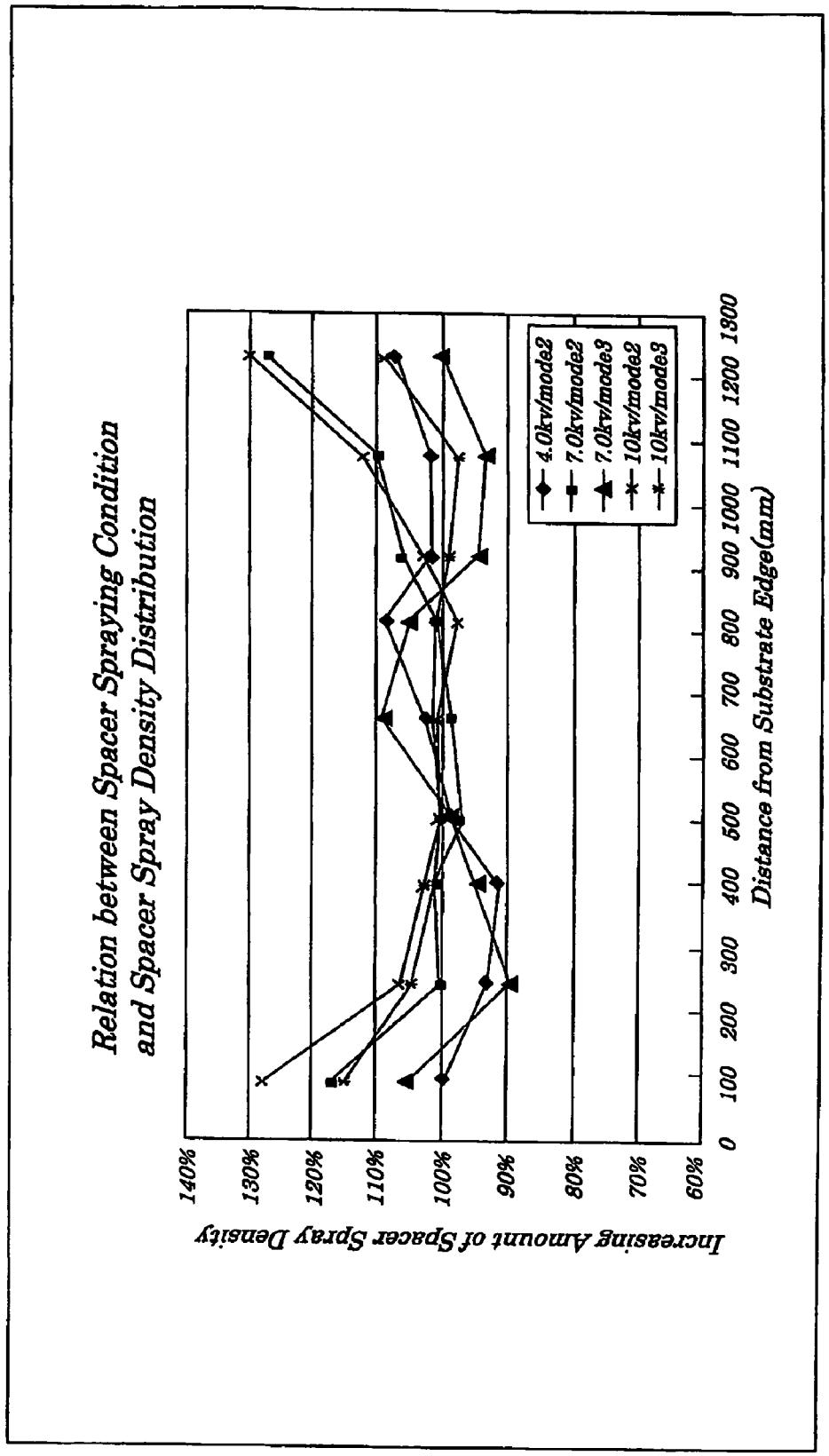
FIG. 14 is a graph showing a correlation among a chamber wall surface voltage, spraying mode, and distribution of the number of spacers on a substrate in a conventional spacer spraying system.

In FIGS. 11A, 11B, and 11C, the convex portion is formed in the lower portion of the main stage section 3a and another convex portion is formed also in the upper portion of the auxiliary stage section 3b and the two convex portions come into contact with each other and, as a result, the auxiliary stage section 3b is made to be connected to the main stage section 3a. However, the main stage section 3a is connected to the auxiliary stage section 3b in an arbitrary manner and, for example, as shown in FIGS. 12A and 12B, the convex portion (or concave portion) is formed in at least a part of an outer edge portion of the main stage section 3a and a concave portion (or convex portion) to be fitted into the convex portion (or concave portion) is formed in at least a part of the inner edge portion of the auxiliary stage section 3b and, by fitting these convex or concave portions, connection of the main stage section 3a and auxiliary stage section 3b may be established. Moreover, in FIGS. 12A and 12B, the auxiliary stage section 3b is connected to two sides in upper and lower portions of the main stage section 3a. However, the auxiliary stage section 3b may be connected to at least one side of the main stage section 3a. For example, the concave portion is formed in all the peripheral edge portions of the main stage section 3a and the auxiliary stage section 3b is formed in a manner to correspond to each side and the auxiliary stage section 3b may be connected to only a portion of the stage 3 whose size is desired to be changed.

Moreover, also in the second embodiment, in order to measure variations in the distribution of the number of spacers caused by attachment of the auxiliary stage section 3b, a spacer spraying amount measuring means such as a probe, Hall device, or a like as described above may be mounted in the spacer spraying system 1 in advance. The main stage section 3a and the auxiliary stage section 3b maybe set at the same potential and, when the influence by the edge portion of the stage 3 is finely controlled, the auxiliary stage section 3b may be set at a potential being different from that of the main stage section 3a. Furthermore, in the second embodiment, the auxiliary stage section 3b is so configured as to be removable and, after the completion of spraying the spacers once, only the auxiliary stage section 3b may be detached from the main stage section 3a to be cleaned and, therefore, fluctuations of an electric field caused by deposition of spacers can be suppressed, thus enabling spacer spraying density to be accurately controlled.

Thus, according to the second embodiment, the auxiliary stage section 3b selected in a manner to correspond to a size of the substrate 10 to be mounted on the stage 3 can be connected to the main stage section 3a and the distance between the edge portion of the stage 3 and the edge portion of each of the liquid crystal display panel forming regions 10a on the substrate 10 can be set within a predetermined range and, therefore, variations in the spacer density distribution caused by concentration of an electric field in the edge portion of the stage 3 can be suppressed and, irrespective of a size of substrate 10 and/or a cutting position on the substrate 10, distribution of spacers can be kept in an optimum state all the time.

Moreover, in the case where the auxiliary stage section 3b is attached to the main stage section 3a, a difference in height between the main stage section 3a and auxiliary stage section 3b can be eliminated and, therefore, an electric field is not concentrated in a portion where the main stage section 3a is connected to the auxiliary stage section 3b, thus enabling more exact control on spacer spraying density. Also, in the case of the above first embodiment, the auxiliary stage section 3b is slid in the main stage section 3a and, as a result, structurally, there is a portion where the auxiliary stage section 3b is not placed in a corner of the main stage section 3a. However, in the case of the second embodiment, the auxiliary stage section 3b is connected to the main stage section 3a and, therefore, the stage 3, as a whole, can be made rectangular with the auxiliary stage section 3*b* being connected to the main stage section 3*a*, thus enabling exact control on the spacer spraying density.

As described above, according to the embodiments of the present invention, the stage of the spacer spraying system to be used for manufacturing of the liquid crystal display panel includes the main stage section to be fixed to the chamber and the auxiliary stage section having the structure in which the auxiliary stage section is supported so as to be able to be slid in the main stage section or in which the auxiliary stage section is able to be connected to the main stage section and the size of the stage is made changeable according to a size of the substrate placed on the stage so that a distance between an edge portion of the stage and a liquid crystal display panel forming region existing near to the edge portion of the stage at the edge portion of the stage can be reduced. This enables improvement of uniformity of spacer spraying density and manufacturing of the liquid crystal display panel of high displaying quality at a high yield and low costs obtained by controlling the gap between a pair of substrates facing each other so as to be uniformed.

It is apparent that the present invention is not limited to the above embodiments but may be changed and modified without departing from the scope and spirit of the invention. The present invention is applied to any liquid crystal display panel having a structure in which a liquid crystal is put between two pieces of substrates facing each other. That is, the present invention can be applied to any type of liquid crystal display panel including a TN (Twisted Nematic)-type liquid crystal display panel in which a transparent electrode is formed in each of substrates and a liquid crystal is driven by an electric field in a longitudinal direction between the substrates, an IPS (In Plane Switching)-type liquid crystal display panel in which a comb-toothed like electrode is formed on one of the substrates and a liquid crystal is driven by an electric field between the substrates, or a like. The spacer spraying system and the spacer spraying method can be applied not only to the substrates to be used for a liquid crystal display panel but also to any substrate.

What is claimed is:

1. A spacer spraying system comprising a spraying nozzle, a chamber, and a stage being supported within said chamber, for spraying spacers onto a substrate placed on said stage by using said spraying nozzle,
wherein said stage comprises a main stage section having a predetermined size and at least one auxiliary stage section associated with said main stage section, in such a manner that said stage is extendable to a desired size, and
wherein said at least one auxiliary stage section is housed in a space formed in said main stage section, said space having an opening in at least one side of said main stage section in such a manner that said at least one auxiliary stage section is drawn out from said space.

2. The spacer spraying system according to claim 1, wherein an insulator is placed between said main stage section and said auxiliary stage section so that said main stage section and said auxiliary stage section have electric potentials being different from each other.

3. The spacer spraying system according to claim 1, wherein said substrate is provided with a plurality of regions in each of which a liquid crystal display panel is formed and wherein said auxiliary stage section is associated with said main stage section, so that a distance between a peripheral edge portion of said stage and each of said regions existing near the peripheral edge portion of said stage falls within a predetermined range.

4. A spacer spraying system comprising a spraying nozzle, a chamber, and a stage being supported within said chamber, for spraying spacers onto a substrate placed on said stage by using said spraying nozzle,
wherein said stage comprises a main stage section having a predetermined size and at least one auxiliary stage section being attached to said main stage section in such a manner that said at least one auxiliary stage section slides out from said main stage section in a direction parallel to a main face of said main stage section, whereby said stage is extendable to a desired size.

5. The spacer spraying system according to claim 4, wherein said auxiliary stage section is supported in a manner in which an upper face of said auxiliary stage section comes into contact with a corresponding portion of said main stage section and wherein said spacers deposited on an upper face of said auxiliary stage section are removed or scraped by making said auxiliary stage section slide out from said main stage section.

6. The spacer spraying system according to claim 4, wherein an insulator is placed between said main stage section and said auxiliary stage section so that said main stage section and said auxiliary stage section have electric potentials being different from each other.

7. The spacer spraying system according to claim 4, wherein said substrate is provided with a plurality of regions in each of which a liquid crystal display panel is formed and wherein said auxiliary stage section is slid out so that a distance between a peripheral edge portion of said stage and each of said regions existing near the peripheral edge portion of said stage falls within a predetermined range.

8. A liquid crystal display panel in which the spacers are sprayed on at least one of a pair of substrates facing each other by using the spacer spraying system stated in any one of claim 1 to claim 3.

9. A liquid crystal display panel in which the spacers are sprayed on at least one of a pair of substrates facing each other by using the spacer spraying system stated in any one of claim 4 to claim 7.

\* \* \* \* \*

UNITED STATES PATENT AND TRADEMARK OFFICE
CERTIFICATE OF CORRECTION

PATENT NO. : 7,652,742 B2
APPLICATION NO. : 11/191974
DATED : January 26, 2010
INVENTOR(S) : Toshihiko Motomatsu It is certified that error appears in the above-identified patent and that said Letters Patent is hereby corrected as shown below:

Column 8, line 4, delete "5a to 5b" and insert --5a to 8b--.

Signed and Sealed this

Twenty-first Day of September, 2010

David J. Kappos
*Director of the United States Patent and Trademark Office*